(No Model.)
E. RILEY.
Pipe Coupling.
No. 233,434.    Patented Oct. 19, 1880.
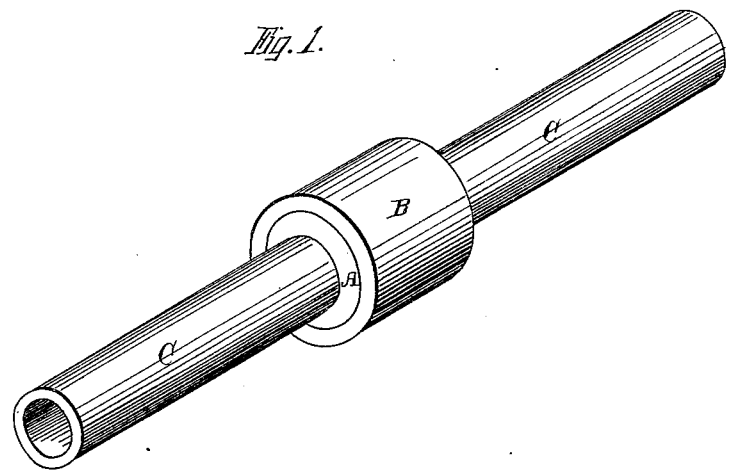
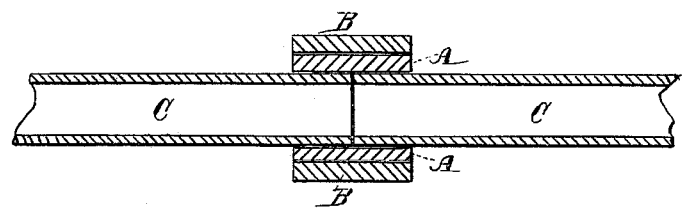
Witnesses
Geo. H. Strong.
Frank A. Brooks
Inventor
Eugene Riley
By Dewey & Co.
Attys

UNITED STATES PATENT OFFICE.

EUGENE RILEY, OF SAN FRANCISCO, CALIFORNIA.

PIPE-COUPLING.

SPECIFICATION forming part of Letters Patent No. 233,434, dated October 19, 1880.

Application filed July 17, 1880. (No model.)

*To all whom it may concern:*

Be it known that I, EUGENE RILEY, of the city and county of San Francisco, and State of California, have invented an Improved Pipe-Coupling; and I hereby declare the following to be a full, clear, and exact description thereof.

My invention relates to a novel pipe-coupling, which will be more fully described by reference to the accompanying drawings, in which—

Figure 1 is a view of the meeting ends of two pipes, the sleeve, and the independent joint-ring. Fig. 2 is a section.

In the formation of joints between the meeting ends of metal pipes of various forms lead and other packing is often used. When lead packing is used it is usually cast within a sleeve which surrounds the meeting ends of the pipes after they have been laid and united, and then tamped so as to be tight, or the lead is cast into a sleeve which forms part of or is secured to one part of the pipe, so that the end of the meeting pipe may be introduced and then tamped.

My invention consists in the formation of a hollow cylinder, A, of wood, of such an exterior size as to fit within a sleeve, B, and having an interior diameter which will just admit the size of the pipe C to be used. These cylinders may be turned or otherwise formed at the shop in quantity and delivered at any point where pipes are to be laid, while the pipes and the exterior sleeves may be delivered at the same point in their ordinary condition and without any previous preparation.

When my pipes are to be laid the ends of two lengths of pipe are brought together within one of the sleeves, a wooden cylinder being previously slipped over the end of one of the pipes. When the ends of the pipes have been brought together within the sleeve the cylinder is driven or forced into place within the sleeve, and so as to cover the ends of the pipes. When the pipe has been united with this sort of packing and water allowed to flow in it, it will cause the wood to swell and fill the sleeve and fit the pipe so tightly as to make a perfectly-solid joint. This joint is very economical, easily made, and durable. It is made at an expense much less than a metal joint.

Having thus described my invention, what I claim as new, and desire to secure by Letters Patent, is—

The described pipe-coupling, consisting of an outer cylinder and an independent wooden ring adapted to swell and form a tight joint.

In witness whereof I have hereunto set my hand.

EUGENE RILEY.

Witnesses:
GEO. H. STRONG,
S. H. NOURSE.